(12) United States Patent
Besselink et al.

(10) Patent No.: US 8,863,903 B2
(45) Date of Patent: Oct. 21, 2014

(54) PLATFORM FOR WIND TURBINE

(75) Inventors: Mikel Hendrikus Jozef Besselink, Habrinkhoek (NL); Marco Johannes Bernardus Oostenbrink, Enschede (NL); Gerhard Reineke, Paderborn (DE)

(73) Assignee: Special Blade Service B.V., Enschede (NL)

( * ) Notice: Subject to any disclaimer, the term of this patent is extended or adjusted under 35 U.S.C. 154(b) by 190 days.

(21) Appl. No.: 13/157,435

(22) Filed: Jun. 10, 2011

(65) Prior Publication Data

US 2011/0303488 A1 Dec. 15, 2011

(30) Foreign Application Priority Data

Jun. 10, 2010 (NL) ..................... 2004871

(51) Int. Cl.
*E04G 3/30* (2006.01)
*F03D 1/00* (2006.01)
*B66C 23/26* (2006.01)
*B66F 11/04* (2006.01)

(52) U.S. Cl.
CPC *E04G 3/30* (2013.01); *F03D 1/003* (2013.01); *B66C 23/26* (2013.01); *B66F 11/04* (2013.01); *Y02E 10/72* (2013.01)
USPC ............ 182/142; 182/143; 182/150; 182/187

(58) Field of Classification Search
CPC ........... F03D 1/003; E04G 3/30; E04G 3/305; E04G 3/32; E04G 3/24; E04G 3/243; E04G 2005/008
USPC ............ 182/36, 142–145, 147, 150, 187
See application file for complete search history.

(56) References Cited

U.S. PATENT DOCUMENTS

| | | | | | |
|---|---|---|---|---|---|
| 1,751,131 | A | * | 3/1930 | Costello | 182/136 |
| 2,336,432 | A | * | 12/1943 | Wilson | 182/69.4 |
| 2,600,199 | A | * | 6/1952 | Brewster | 182/113 |
| 3,420,332 | A | * | 1/1969 | Textor | 182/128 |
| 3,677,367 | A | * | 7/1972 | Shotmeyer | 182/136 |
| 3,837,428 | A | * | 9/1974 | Gish | 182/129 |
| 4,270,628 | A | * | 6/1981 | Anderson | 212/261 |
| 4,386,680 | A | * | 6/1983 | Reed | 182/142 |
| 4,583,617 | A | * | 4/1986 | Berger | 182/142 |
| 4,640,384 | A | * | 2/1987 | Kucher et al. | 182/51 |
| 5,127,491 | A | * | 7/1992 | Just-Buddy | 182/142 |
| 6,318,503 | B1 | * | 11/2001 | Hernandez | 187/239 |
| 7,191,873 | B2 | * | 3/2007 | Korchagin et al. | 187/239 |
| 8,062,431 | B2 | * | 11/2011 | Kumar et al. | 134/10 |
| 8,083,029 | B2 | * | 12/2011 | Teichert | 182/128 |
| 8,151,940 | B2 | * | 4/2012 | Gordon et al. | 187/239 |
| 8,151,941 | B2 | * | 4/2012 | Moses et al. | 187/239 |
| 2005/0042102 | A1 | * | 2/2005 | Teichert | 416/146 R |
| 2006/0065485 | A1 | * | 3/2006 | Reed | 182/82 |
| 2006/0175465 | A1 | * | 8/2006 | Teichert | 244/33 |
| 2007/0007074 | A1 | * | 1/2007 | Lemburg et al. | 182/128 |

* cited by examiner

*Primary Examiner* — Alvin Chin-Shue
*Assistant Examiner* — Colleen M Chavchavadze
(74) *Attorney, Agent, or Firm* — The Webb Law Firm

(57) ABSTRACT

The invention relates to an aerial platform for a wind turbine with a tower and rotor blades arranged on the tower, which aerial platform comprises: a vehicle; at least a first pair of cables and a second pair of cables, which are each attached with one end to the vehicle and can be attached with the other end close to the upper side of the tower of the wind turbine; a lift cradle which is guided by at least a first pair of cables; and hoisting means for hoisting the lift cradle with the second pair of cables along the first pair of cables. The invention further comprises a lift cradle for an aerial platform according to the invention.

10 Claims, 4 Drawing Sheets

PLATFORM FOR WIND TURBINE

BACKGROUND OF THE INVENTION

The invention relates to an aerial platform for a wind turbine with a tower and rotor blades arranged on the tower.

For maintenance of a wind turbine it is necessary to be able to inspect the wind turbine at regular intervals and optionally be able to carry out maintenance work. It is also necessary here for the rotor blades to be thoroughly inspected, for instance for damage and cracks. Because a wind turbine can be tens of meters up to even more than a hundred meters high, usual aerial platforms such as scissor lifts, telescopic boom lifts or articulating boom lifts cannot be used.

Special aerial platforms have therefore been developed for wind turbines. In the case of such aerial platforms a number of cables are for instance attached to the nacelle of the wind turbine, along which a lift cradle is hoisted upward.

The lift cradle supports here against the tower of the wind turbine.

The drawback is however that the shape of the lift cradle hereby depends on the shape of the tower.

In addition, the position of the rotor blades relative to the tower can vary and differ per type of wind turbine. This will also affect the shape of the lift cradle.

Finally, a system is known, at least on paper, wherein cables hang downward from the top of the wind turbine and are fixed in the ground by means of ground anchors.

The lift cradle is hoisted upward along these cables and does not support here against the tower of the wind turbine. The drawback of this system is that it takes a great deal of time to set up this variant (assembly and disassembly times are greatly reduced).

It is also the case that an inspection and maintenance crew is not normally permitted to arrange ground anchors in the ground, particularly because high-voltage cables are located around a wind turbine.

In addition, it may even be physically impossible to arrange ground anchors in the often rocky ground surface.

SUMMARY OF THE INVENTION

It is now an object of the invention to provide an aerial platform wherein the above stated drawbacks are reduced or even obviated.

This object is achieved with an aerial platform according to the invention, which aerial platform comprises:
  a vehicle;
  at least a first pair of cables and a second pair of cables, which are each attached with one end to the vehicle and can be attached with the other end close to the upper side of the tower of the wind turbine;
  a lift cradle which is guided by at least a first pair of cables; and
  hoisting means for hoisting the lift cradle with the second pair of cables along the first pair of cables.

Because the cables are arranged between the vehicle and the upper side of the wind turbine, the shape of the tower does not affect the lift cradle.

In addition, the use of ground anchors is unnecessary because the cables are attached to the vehicle.

The use of a vehicle further has the advantage that the angle and position of the cables can be easily adjusted by displacing the vehicle.

In a preferred embodiment of the aerial platform according to the invention the vehicle is a trailer.

The lift cradle can be easily transported to the wind turbine on the trailer, after which the trailer can serve as attachment point for the cables.

In an embodiment of the aerial platform according to the invention the lift cradle comprises a horizontal work platform with a central opening for passage of a rotor blade. The work platform can hereby be hoisted round a rotor blade, whereby inspectors can move easily around the rotor blade in order to inspect and carry out possible repairs.

In a further preferred embodiment of the aerial platform according to the invention the work platform comprises at least four platform segments which are pivotally connected to each other in a diamond shape using hinges. Because the platform segments can pivot in a diamond shape, the shape of the opening in the platform can be adjusted to the cross-sectional form of the rotor blade.

At the tip the rotor blade is flat, while at the hub the rotor blade is more round.

In yet another embodiment of the aerial platform according to the invention the at least four platform segments comprise two short platform segments connected pivotally to each other and two long platform segments connected pivotally to each other.

Owing to the two long and two short platform segments the opening in the platform can be adjusted still further to the wing profile of the rotor blades.

In yet another embodiment of the aerial platform according to the invention vertically extending, elongate cable guides are arranged on either side of the lift cradle.

The elongate cable guides ensure that the lift cradle can be moved in stable manner along the cables, wherein the chance of tilting is reduced.

The elongate cable guides preferably comprise a telescopic tube.

The cable guide can hereby also protrude below the platform during use, while the cable guides are retracted during transport on a vehicle.

In another embodiment of the aerial platform according to the invention the lift cradle comprises an extendable spacer for holding the lift cradle at a distance from the tower.

The spacer can be advantageous in the case the lift cradle moves back and forth as a result of for instance wind.

The lift cradle can be better stabilized by the spacer, whereby work on a rotor becomes easier.

The invention further relates to a lift cradle for an aerial platform according to the invention, comprising a horizontal work platform with a central opening for passage of a rotor blade, wherein the work platform comprises at least four platform segments which are pivotally connected to each other in a diamond shape using hinges.

In a preferred embodiment of the lift cradle according to the invention the at least four platform segments comprise two short platform segments pivotally connected to each other and two long platform segments pivotally connected to each other. These and other features according to the invention are further elucidated with reference to the accompanying drawings.

DETAILED DESCRIPTION OF THE DRAWINGS

DETAILED DESCRIPTION OF THE INVENTION

Figure 1:
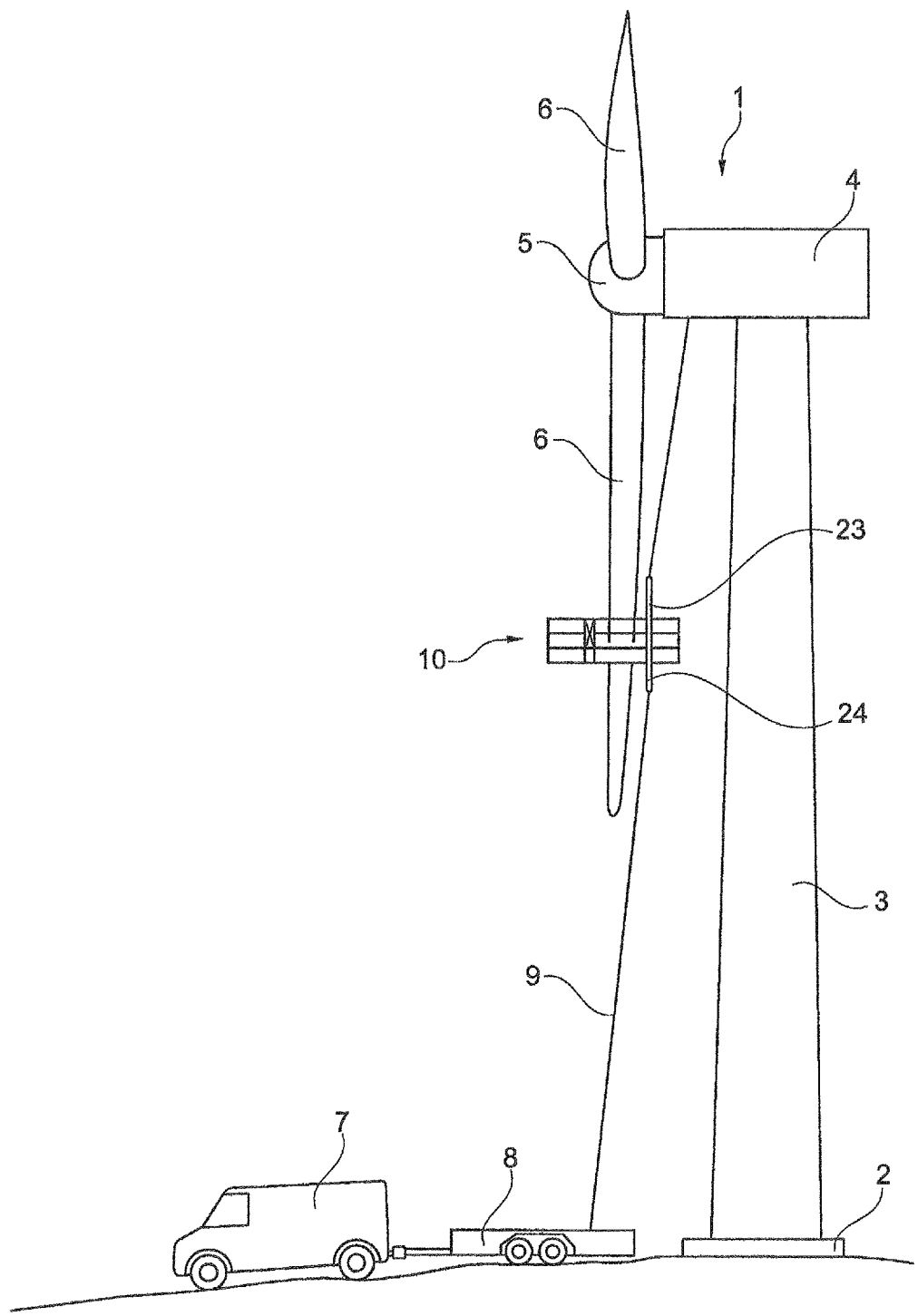
FIG. 1 shows a schematic view of an embodiment of an aerial platform.
Figure 2:
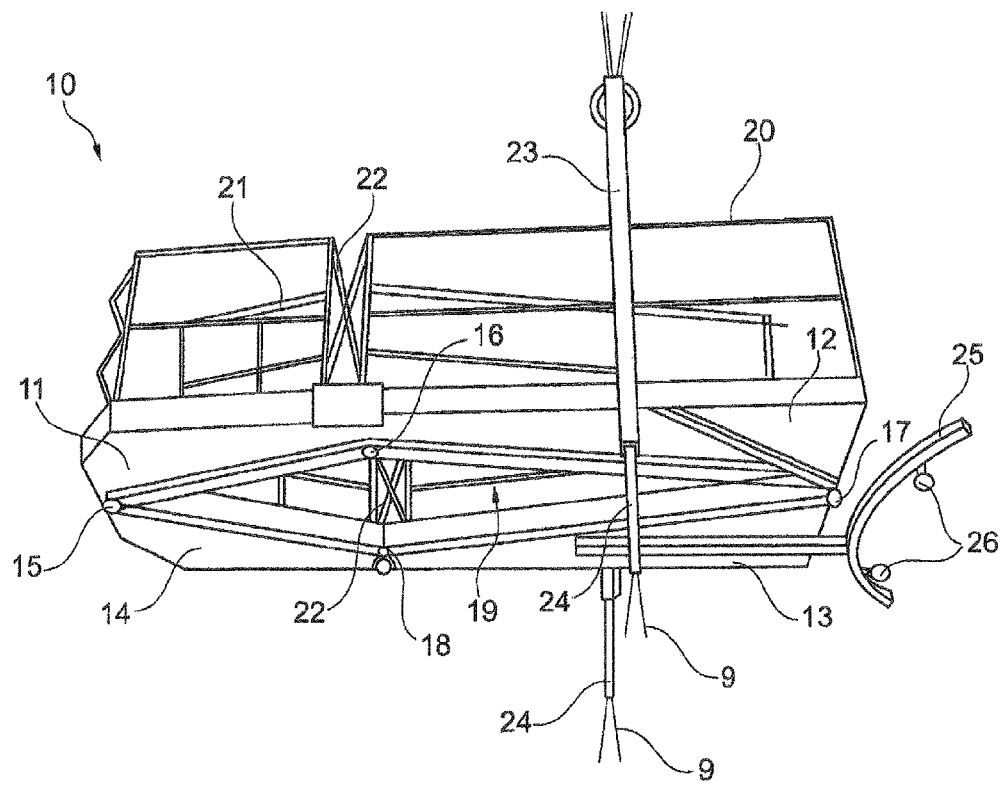
FIG. 2 shows a perspective view of the aerial platform according to FIG. 1.

FIG. 1 shows a wind turbine 1. This wind turbine 1 has a foundation 2 on which a tower 3 stands. A nacelle 4 is arranged on the upper side of tower 3. The generator and other parts are arranged in this nacelle 4. Three rotor blades 6 are arranged on hub 5 of wind turbine 1.

A van 7 with a trailer 8 is placed at the foot of wind turbine 1. Cables 9 run from this trailer 8 to nacelle 4. A lift cradle 10 is hoisted upward along cables 9. Usual cable winches (not shown) are provided for this purpose around lift cradle 10.

Lift cradle 10 has four platform parts 11, 12, 13, 14 which are mutually connected via pivot points 15, 16, 17, 18. A central opening 19 into which a rotor blade 6 can be inserted is provided through the four platform parts 11, 12, 13, 14.

Fences 20, 21 are arranged along both the inner edge and outer edge of platform parts 11, 12, 13, 14. Scissor gates 22 are arranged at pivot points 15, 16, 17, 18 to enable the pivoting of platform parts 11, 12, 13, 14 relative to each other, while safety is maintained by means of fences 20, 21, 22.

Figure 5:
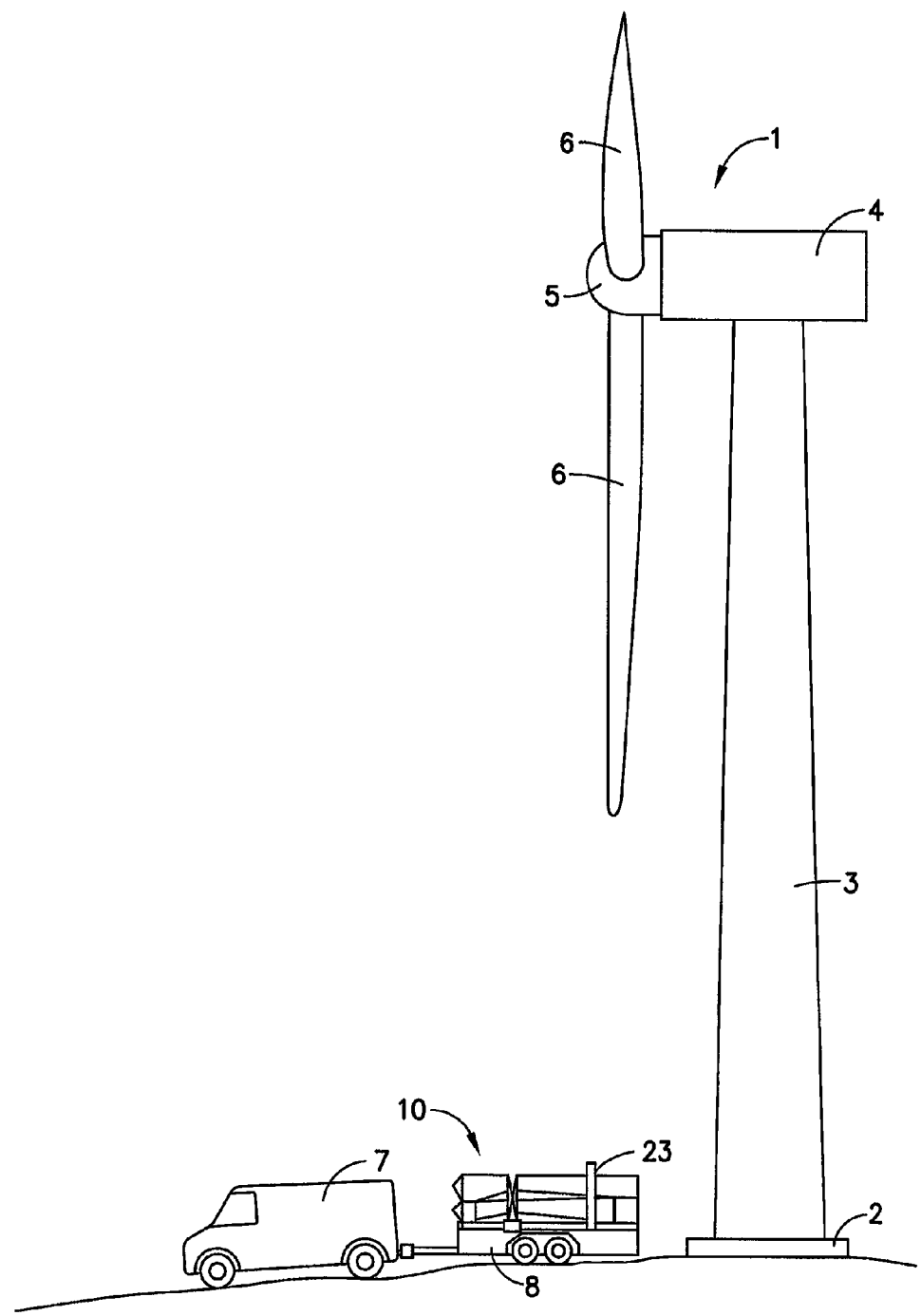
FIG. 5 shows a schematic view of the aerial platform loaded on a trailer.

Cable guides 23, 24 with the cables 9 passing through are arranged only on opposing sides 27, 28 of the lift cradle 10 defined by platform parts 11, 12, 13, 14, wherein the opposing sides 27, 28 are adjacent to the side 29 directed toward tower 3. These cable guides 23, 24 are telescopic so that the bottom part 24 of the cable guides slides into part 23 when lift cradle 10 is placed on trailer 8, as shown in FIG. 5.

Platform parts 11, 12, 13, 14 have a spacer 25 on the side 29 directed toward the tower 3. This spacer 25 is provided with wheels 26 so that spacer 25 can slide along the tower while lift cradle 10 can be lifted. Spacer 25 is extendable here so that it can be easily adjusted to the distance between tower 3 and lift cradle 10.

Figure 3:
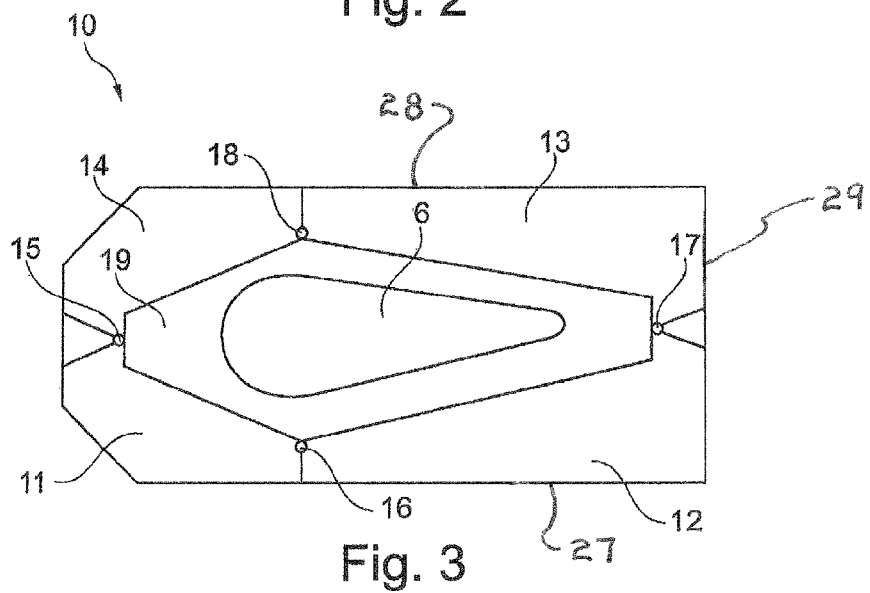
FIG. 3 shows a top view of the lift cradle in a first position.

FIG. 3 shows a top view of lift cradle 10 with the tip of a rotor blade 6 in the central opening. Platform parts 11, 12, 13, 14 are pivoted relative to each other such that the shape of central opening 19 corresponds to the cross-section of rotor blade 6.

Figure 4:
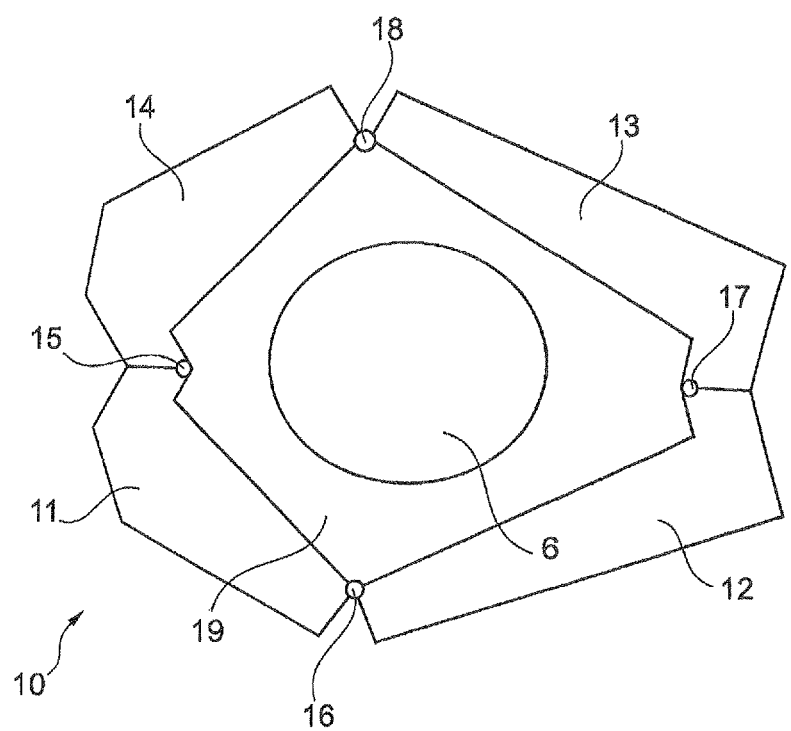
FIG. 4 shows a top view of the lift cradle in the second position.

FIG. 4 shows the position of lift cradle 10 when lift cradle 10 is situated close to nacelle 4 of wind turbine 1. Rotor blade 6 has a more circular cross-section here. Platform parts 11, 12, 13, 14 are therefore pivoted relative to each other such that central opening 19 has a more circular opening.

It will further be apparent that the edge along central opening 19 is provided with a resilient material which cannot cause damage to a rotor blade 6 should lift cradle 10 accidentally come into contact with rotor blade 6.

The invention claimed is:

1. An aerial platform for a wind turbine with a tower and rotor blades arranged on the tower, which aerial platform comprises:
   a vehicle comprising a trailer bed;
   at least a first pair of cables and a second pair of cables, which are each attached with one end to the vehicle and can be attached with the other end close to the upper side of the tower of the wind turbine;
   a lift cradle which is guided by the at least first pair of cables;
   wherein the lift cradle is adapted to be hoisted with the second pair of cables along the first pair of cables;
   wherein vertically extending, elongate, and nesting telescopic cable guides are arranged only on opposing sides of the lift cradle adjacent to a side directed toward the tower;
   wherein the cable guides are telescopic such that a bottom part of the cable guides slide into an upper part of the cable guides when the lift cradle is placed on the trailer bed;
   wherein the at least first pair of cables and the at least second pair of cables extend through the cable guides; and
   wherein the lift cradle comprises a horizontal work platform with a central opening for passage of a rotor blade.

2. The aerial platform as claimed in claim 1, wherein the vehicle is a towed trailer.

3. The aerial platform as claimed in clam 1, wherein the work platform comprises at least four platform segments which are pivotally connected to each other in a substantially diamond shape using hinges.

4. The aerial platform as claimed in claim 3, wherein the at least four platform segments comprise two short platform segments connected pivotally to each other and two long platform segments connected pivotally to each other.

5. The aerial platform as claimed in claim 1, the nesting telescopic cable guides comprise a tube.

6. The aerial platform as claimed in claim 1, wherein the lift cradle comprises an extendable spacer for holding the lift cradle at a distance from the tower.

7. A lift cradle for an aerial platform, wherein the lift cradle comprises a horizontal work platform with a central opening for passage of a rotor blade, wherein the work platform comprises at least four platform segments which are pivotally connected to each other in a substantially diamond shape using hinges, wherein the at least four platform segments comprise two short platform segments pivotally connected to each other and two long platform segments pivotally connected to each other;
   wherein the lift cradle is adapted to be hoisted along at least a first pair of cables with a second pair of cables;
   wherein vertically extending, elongate, and nesting telescopic cable guides are arranged only on opposing sides of the lift cradle adjacent to a side directed toward a tower supporting the rotor blade;
   wherein the cable guides are telescopic such that a bottom part of the cable guides slide into an upper part of the cable guides when the lift cradle is placed on a trailer bed adapted to haul the lift cradle; and
   wherein the at least first pair of cables and the at least second pair of cables extend through the guides.

8. The lift cradle for an aerial platform as claimed in clam 7, wherein the trailed bed is part of a towed trailer.

9. The lift cradle for an aerial platform as claimed in claim 7, the nesting telescopic cable guides comprise a tube.

10. The lift cradle for an aerial platform as claimed in claim 7, wherein the lift cradle comprises an extendable spacer for holding the lift cradle at a distance from the tower.

* * * * *